US 11,613,174 B2

(12) United States Patent
Cho et al.

(10) Patent No.: US 11,613,174 B2
(45) Date of Patent: Mar. 28, 2023

(54) APPARATUS FOR PURGING FUEL EVAPORATION GAS IN FUEL SYSTEM

(71) Applicants: Hyundai Motor Company, Seoul (KR); Kia Motors Corporation, Seoul (KR)

(72) Inventors: Seong Cheol Cho, Seoul (KR); Sung Won Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/129,098

(22) Filed: Dec. 21, 2020

(65) Prior Publication Data

US 2021/0370760 A1 Dec. 2, 2021

(30) Foreign Application Priority Data

May 29, 2020 (KR) .................. 10-2020-0064676

(51) Int. Cl.
*B60K 15/03* (2006.01)
*F02M 35/10* (2006.01)
(52) U.S. Cl.
CPC ....... *B60K 15/03* (2013.01); *F02M 35/10222* (2013.01); *B60K 2015/0325* (2013.01); *B60K 2015/03111* (2013.01)

(58) Field of Classification Search
CPC .......... F02M 25/0836; F02M 25/0854; F02M 25/0872
See application file for complete search history.

(56) References Cited

U.S. PATENT DOCUMENTS

| | | | |
|---|---|---|---|
| 2004/0200460 A1* | 10/2004 | Mitani | F02M 25/0818 123/520 |
| 2010/0037866 A1* | 2/2010 | Tipton | F02M 37/106 123/509 |
| 2019/0249624 A1* | 8/2019 | Seki | F02M 25/08 |

FOREIGN PATENT DOCUMENTS

| | | |
|---|---|---|
| JP | 2005-030324 A | 2/2005 |
| JP | 6385861 B2 | 9/2018 |
| JP | 6551116 B2 | 7/2019 |
| KR | 100774350 B1 | 11/2007 |

* cited by examiner

*Primary Examiner* — Grant Moubry
*Assistant Examiner* — Ruben Picon-Feliciano
(74) *Attorney, Agent, or Firm* — Fox Rothschild LLP (57) ABSTRACT

An apparatus is provided for purging fuel evaporation gas in a fuel system. The apparatus increases an amount of fuel evaporation gas that is desorbed from a canister during driving of an engine, and thus prevents fuel evaporation gas adsorbed to the canister from being discharged to the atmosphere.

12 Claims, 4 Drawing Sheets

PRIOR ART

US 11,613,174 B2

APPARATUS FOR PURGING FUEL EVAPORATION GAS IN FUEL SYSTEM

CROSS-REFERENCE TO RELATED APPLICATION

This application claims under 35 U.S.C. § 119(a) the benefit of priority to Korean Patent Application No. 10-2020-0064676 filed on May 29, 2020, the entire contents of which are incorporated herein by reference.

BACKGROUND

(a) Technical Field

The present disclosure relates to an apparatus for purging fuel evaporation gas in a fuel system, and more particularly, to an apparatus for purging fuel evaporation gas in a fuel system that increases the amount of fuel evaporation gas desorbed from a canister.

(b) Background Art

Generally, fuel evaporation gas, which contains fuel constituents such as hydrocarbons (HC), is generated in a fuel tank in a vehicle due to evaporation of the fuel in the fuel tank. To prevent the atmosphere from being contaminated by the fuel evaporation gas generated in a fuel tank, a vehicle is provided with a canister configured to collect the fuel evaporation gas from the fuel tank.

The canister has a case or tank filled with an adsorptive material capable of adsorbing fuel evaporation gas moved from a fuel tank. Activated carbon is extensively used as the adsorptive material. The activated carbon functions to adsorb hydrocarbons (HC) and the like, which are the fuel constituents in the fuel evaporation gas introduced into the case of a canister.

The canister is constructed such that fuel evaporation gas is adsorbed to an adsorptive material while an engine is stopped and the fuel evaporation gas is desorbed from the adsorptive material by the pressure of air introduced from the outside (atmosphere) and supplied to an engine intake system together with the air while the engine is being driven. In other words, the adsorption of the fuel evaporation gas in the canister is conducted while the engine is stopped, and the desorption of the fuel evaporation gas in the canister is conducted while the engine is being driven. An operation of desorbing the fuel evaporation gas, collected in the canister, from the adsorptive material and of discharging the fuel evaporation gas to the engine is referred to as a purge operation.

Figure 5:
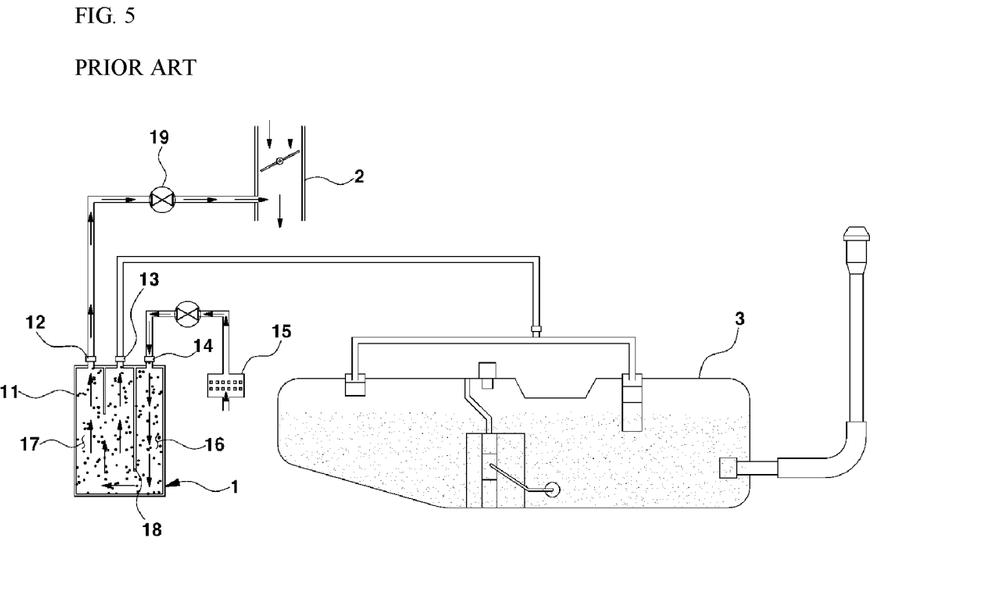
FIG. 5 is a view illustrating a fuel system to which a conventional apparatus for purging fuel evaporation gas is applied according to the prior art.

The construction of a typical canister will be described in more detail with reference to FIG. 5 according to the prior art. The canister 1 includes a case 11, which is filled with an adsorptive material. The case 11 includes a purge port 12, which is connected to an engine intake system 2 to allow fuel evaporation gas to be transferred to an engine, an inlet port 13, which is connected to a fuel tank 3 to allow fuel evaporation gas to be introduced thereinto, and an atmosphere port 14, which is connected to an air filter (i.e., a canister filter) 15 to allow air in the atmosphere to be suctioned thereinto.

The case 11 is provided in the internal space thereof with a partition wall 18, which partitions the internal space in the case 11 into a first space 16, in which the atmosphere port 14 is formed, and a second space 17, in which the purge port 12 and the inlet port 13 are formed. The fuel evaporation gas introduced into the canister 11 from the fuel tank 3 through the inlet port 13 is adsorbed to the adsorptive material while passing through the second space 17. Specifically, hydrocarbons, which are the fuel constituent contained in the fuel evaporation gas, are adsorbed to the adsorptive material.

A purge line, which connects the purge port 12 in the canister 1 to the engine intake system 2, is provided with a purge control solenoid valve (hereinafter, referred to as a "PCSV") 19 for controlling the purge operation. The PCSV 19 is a valve configured to be opened upon purge operation during driving of the engine. The fuel evaporation gas generated in the fuel tank is collected in the canister 1, and is purged to the engine intake system 2 and combusted therein when the PCSV 19 is opened.

The fuel evaporation gas, which is collected in the canister 1, is desorbed from the adsorptive material and is suctioned into the engine intake system 2 by the negative pressure in the engine intake system 2 when the PCSV 19 is opened. In other words, the fuel evaporation gas is desorbed from the adsorptive material by the negative pressure generated in the engine intake system 2 during driving of the engine, and is purged to the engine intake system 2 through the purge port 12 and then combusted in the engine.

However, when the temperature of a vehicle increases or the vehicle is left idle for a long period of time, the fuel evaporation gas collected in the canister flows to the first space, in which the atmosphere port is formed, from the second space, in which the purge port and the inlet port are formed, and is discharged to the atmosphere through the atmosphere port. Furthermore, when the canister is used for a long period of time, the polymer component in the fuel evaporation gas remains in the state of being adsorbed to the adsorptive material, thereby causing a phenomenon in which the working capacity of the canister is decreased.

The above information disclosed in this section is merely for enhancement of understanding of the background of the invention and therefore it may contain information that does not form the prior art that is already known in this country to a person of ordinary skill in the art.

SUMMARY

The present invention provides an apparatus for purging fuel evaporation gas in a fuel system, which is capable of increasing the amount of fuel evaporation gas desorbed from a canister during driving of an engine, and thus of preventing fuel evaporation gas adsorbed to the canister from being discharged to the atmosphere.

In one aspect, the present invention provides an apparatus for purging fuel evaporation gas in a fuel system including a canister connected to a fuel tank to collect and store fuel evaporation gas transferred from the fuel tank, a first purge port provided in the canister to be connected to an engine intake system, the first purge port allowing fuel evaporation gas collected in the canister to be transferred to the engine intake system by virtue of the negative pressure generated in the engine intake system during driving of an engine, and a second purge port provided in the canister to be connected to a dual jet pump of a fuel pump module disposed in the fuel tank, the second purge port allowing the fuel evaporation gas collected in the canister to be transferred to the dual jet pump by virtue of the negative pressure generated in the dual jet pump during driving of the engine.

In an exemplary embodiment, the fuel pump module may include a reservoir cup disposed in the fuel tank to receive the fuel in the fuel tank via the dual jet pump, a fuel pump configured to transfer the fuel in the reservoir cup to the engine under pressure and to transfer the fuel to the dual jet pump during driving of the engine, and the dual jet pump configured to generate the negative pressure required to suction the fuel in the fuel tank and the fuel evaporation gas in the canister using the pressure generated by discharging the fuel supplied from the fuel pump.

In another exemplary embodiment, the duel jet pump may include a first jet pump connected to the fuel pump and configured to suction the fuel in the fuel tank and to discharge the fuel into the reservoir cup by virtue of the negative pressure generated in the first jet pump when the fuel is supplied from the fuel pump, and a second jet pump connected both to the canister and to the first jet pump and configured to suction the fuel evaporation gas into the canister and to discharge the fuel evaporation gas into the reservoir cup by virtue of the negative pressure generated in the second jet pump when fuel is supplied from the first jet pump.

In still another exemplary embodiment, the first jet pump may include a first jet housing including an introduction port connected to the fuel pump to receive fuel from the fuel pump, a first suction port in communication with the fuel tank to allow the fuel outside the reservoir cup to be introduced thereinto, and a first port in communication with an internal space in the reservoir cup, and a first jet nozzle formed in the first jet housing to spray the fuel supplied from the fuel pump to the first port.

In yet another exemplary embodiment, the second jet pump may include a second jet housing, having therein a second communication port connected to the first jet housing to receive fuel from the first jet housing, a second suction port connected to the second purge port in the canister, and a second port that communicates with the internal space in the reservoir cup, and a second jet nozzle formed in the second jet housing to spray fuel supplied from the first jet housing to the second port.

In still yet another exemplary embodiment, the first jet nozzle may be formed in the first jet housing to be positioned between the introduction port and the first port, and the second jet nozzle may be formed in the second jet housing to be positioned between the second communication port and the second port. In addition, the first jet housing may include a first communication port formed between the introduction port and the first jet nozzle, the first communication port being connected to the second communication port via a communication pipe. The first suction port may be formed between the introduction port and the first port to be positioned outside the first jet nozzle, and the second suction port may be formed between the second communication port and the second port to be positioned outside the second jet nozzle.

The canister may include a case filled with an adsorptive material capable of adsorbing fuel evaporation gas, a partition wall formed in the case to partition an internal space in the case into a first space and a second space, and an atmosphere port formed in a portion of the case to directly communicate with the second space and to allow air to be introduced thereinto. The first purge port may be formed in a portion of the case to directly communicate with the first space, and the second purge port may be formed in a portion of the case to face the atmosphere port in a direction in which air flows in the second space.

BRIEF DESCRIPTION OF THE DRAWINGS

The above and other features of the present invention will now be described in detail with reference to exemplary embodiments thereof, illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, the reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Hereinafter, embodiments of the present invention will be described with reference to the accompanying drawings. The details represented in the accompanying drawings are illustrated schematically for easy description of the exemplary embodiments of the present invention, and may be different from actually embodied forms. The exemplary embodiments of the present invention are intended to increase the amount of fuel evaporation gas in a canister during driving of an engine so as to prevent the fuel evaporation gas adsorbed in the canister from being discharged to the atmosphere.

Accordingly, the fuel evaporation gas collected in the canister is discharged from the canister using the negative pressure generated in an intake system during driving of the engine, and, at the same time, the fuel evaporation gas stored in the canister is discharged from the canister using a jet pump of a fuel pump, which is operated during driving of the engine. The term "purge" used herein means desorbing fuel evaporation gas, which is collected in a canister, from an adsorptive material and discharging the fuel evaporation gas to the outside. More specifically, the fuel evaporation gas, which is collected in the canister, is purged from the canister to an engine or to a reservoir disposed in a fuel tank.

Figure 1:
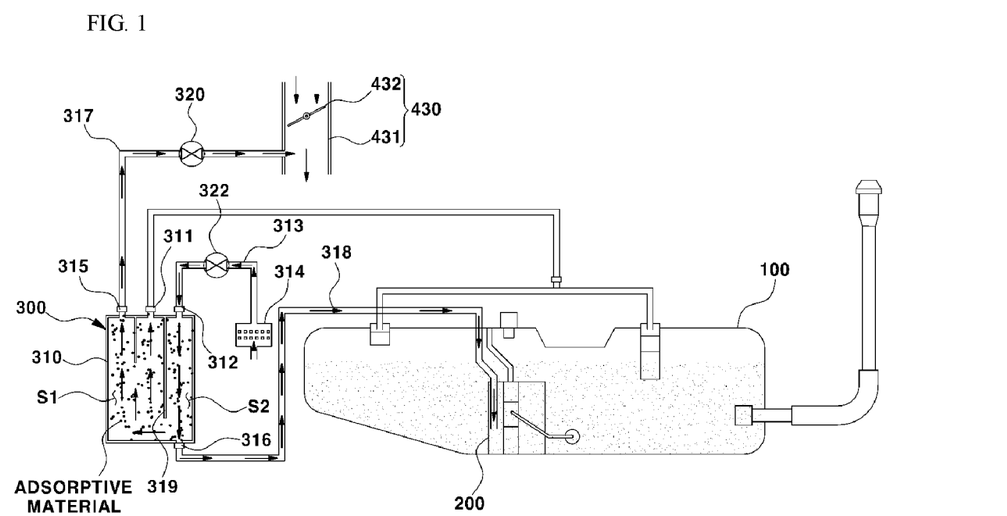
FIG. 1 is a view illustrating a fuel system to which an apparatus for purging fuel evaporation gas according to the present invention is applied.

FIG. 1 illustrates a fuel system to which an apparatus for purging fuel evaporation gas according to an exemplary embodiment of the present invention is applied. As illustrated in FIG. 1, the fuel system may include a fuel tank 100 configured to store fuel therein, a fuel pump module 200 mounted on the bottom of the fuel tank 100, and a canister 300 configured to collect and store fuel evaporation gas generated in the fuel tank 100.

The fuel system may be operated to drive the fuel pump module 200 while an engine is being driven and the fuel in the fuel tank 100 may be supplied to the engine by driving the fuel pump module 200. The canister 300 may include a case 310, which is filled with an adsorptive material capable of adsorbing fuel evaporation gas, and an inlet port 311, an atmosphere port 312 and a purge port 315 and 316, which are formed in the case 310.

The inlet port 311 may be connected to the fuel tank 100 to allow fuel evaporation gas to be introduced thereinto from the fuel tank 100. The fuel evaporation gas introduced into the inlet port 311 may be transferred into the case 310, and may be adsorbed to the adsorptive material. The atmosphere port 312 may be connected to an air filter 314 to allow the air in the atmosphere to be introduced thereinto through the air filter 314. The air introduced into the atmosphere port 312 may be suctioned into the case 310.

The canister 300 is constructed such that fuel evaporation gas may be adsorbed to the adsorptive material while the engine is stopped and the fuel evaporation gas adsorbed to the adsorptive material may be desorbed from the adsorptive material and supplied to the engine intake system 430 together with the air by virtue of the pressure of air suctioned from the outside (atmosphere). In other words, adsorption of the fuel evaporation gas in the canister 300 may be conducted while the engine is stopped, and desorption of the fuel evaporation gas in the canister 300 may be conducted while the engine is running.

In particular, an operation of desorbing the fuel evaporation gas, collected in the canister 300, from the adsorptive material and of discharging the fuel evaporation gas from the canister 300 is referred to as a purge operation. To control the purge operation, a first purge pipe 317, which connects the first purge port 315 of the canister 300 to an engine intake system 430, may include a purge control valve 320 configured to control or adjust the flow of the fuel evaporation gas. The purge control valve 320 may be opened upon the purge operation during driving of the engine. The fuel evaporation gas may be collected in the canister 300, and purged to the engine intake system 430 and combusted therein when the purge control valve 320 is opened.

An atmosphere pipe 313, which connects the atmosphere port 312 to the air filter 314, may include a canister-closing valve 322 configured to control or adjust the flow of air. The pipe members, such as the first purge pipe 317 and the atmosphere pipe 313, provide a transfer path for fluid (e.g., fuel evaporation gas, air and the like). The engine intake system 430 may include an intake pipe 431, into which atmospheric air is introduced, a throttle valve 432, which is provided in the intake pipe 431, and an intake manifold (not shown), which is disposed downstream of the throttle valve 432. Since the construction of the engine intake system is known to the art, a description thereof is omitted. The first purge pipe 317 may be connected to the intake pipe 432, and may be specifically positioned between the throttle valve 432 and the intake manifold and connected thereto.

As illustrated in FIG. 1, the first purge port 315 may be connected to the engine intake system 430 via the first purge pipe 317 to allow the fuel evaporation gas collected in the case 310 to be transferred to the engine intake system 430, and the second purge port 316 may be connected to the fuel pump module 200 via a second purge pipe 318 to allow the fuel evaporation gas collected in the case 310 to be transferred to the fuel tank 100. The internal space in the case 310 may be partitioned into a first space S1, through which the first purge port 315 directly communicates with the inlet port 311, and a second space S2, through which the second purge port 316 directly communicates with the atmosphere port 312, by a partition wall 319 provided in the case 310.

The first purge port 315 may project or protrude from the case 310 so directly communicate with the first space S1, and the atmosphere port 312 may to project or protrude from the case 310 to directly communicate with the second space S2. The second purge port 316 may be formed in the case 310 to face the atmosphere port 312 in a direction in which air flows in the second space S2.

More specifically, all of the first purge port 315, the inlet port 311 and the atmosphere port 312 may be formed in one wall part (i.e., a first wall part) of the case 310, and the second purge port 316 may be formed in another wall part (i.e., a second wall part), which is positioned opposite the first wall part. The first wall part of the case 310 is the wall part that is integrally connected to the partition wall 319, and the second wall part of the case 310 is the wall part that is distant from the partition wall 319. Based on the direction in which the air introduced into the case 310 through the atmosphere port 312 flows, the second purge port 316 is positioned downstream of the atmosphere port 312 but upstream of the first purge port 315.

Consequently, during the purge operation, the air introduced into the case 310 through the atmosphere port 312, flows toward the second purge port 316 in the second space S2, and then flows toward the first purge port 315 in the first space S1 through the space between the free end of the partition wall 319 and the second wall part of the case 310. In conjunction with the flow of air, the fuel evaporation gas collected in the case 310 may be discharged to the outside of the case 310 through the first purge port 315 and the second purge port 316. The fuel evaporation gas collected in the canister 300 may be discharged to the engine intake system 430 through the first purge port 315. The fuel evaporation gas collected in the canister 300 may be transferred to the engine intake system 430 by the negative pressure generated in the engine intake system 430 during driving of the engine.

Figure 2:
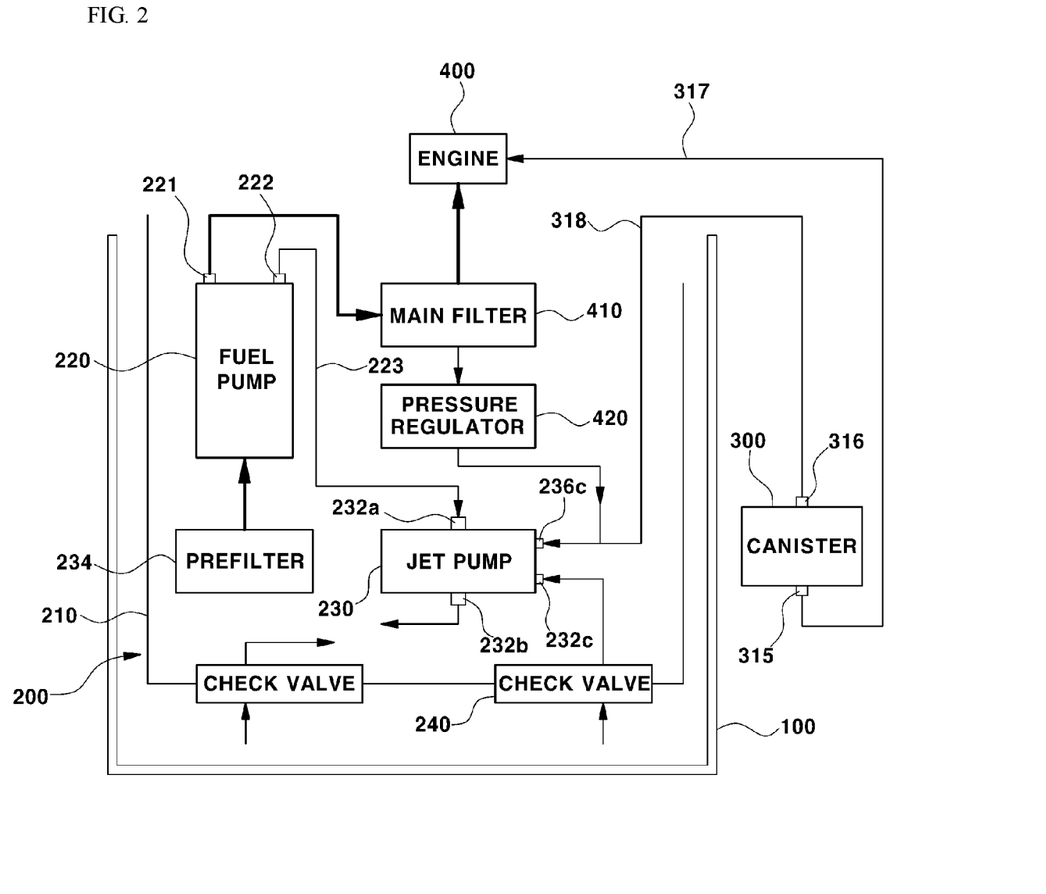
FIG. 2 is a view illustrating the construction of a fuel pump module provided in a fuel tank according to the present invention.

Furthermore, the fuel evaporation gas collected in the canister 300 is discharged to the fuel pump module 200 through the second purge port 316. Referring to FIG. 2, the fuel evaporation gas collected in the canister 300 may be transferred to a dual jet pump 230 by the suction force (i.e., the negative pressure), generated in the dual jet pump 230 of the fuel pump module 200 during driving of the engine. In other words, the fuel evaporation gas in the canister 300 may be transferred to the engine intake system 430 through the first purge port 315, and, at the same time, may be transferred to the fuel tank 100 through the second purge port 316 during driving of the engine.

FIG. 2 is a view illustrating the construction of the fuel pump module provided in the fuel tank. Referring to FIGS. 1 and 2, the fuel pump module 200 may include a reservoir cup 210, which is disposed in the fuel tank 100 to continuously receive the fuel in the fuel tank 100, a fuel pump 220, configured to transfer the fuel in the reservoir cup 210 to the engine under pressure and to transfer the fuel to the dual jet pump 230 during driving of the engine, and the dual jet pump 230, configured to generate the suction force (i.e., negative pressure) required to suction the fuel in the fuel tank 100 and the fuel evaporation gas in the canister 300 by the discharge pressure of the fuel supplied from the fuel pump 220.

The fuel pump 220, disposed in the reservoir cup 210, may suction the fuel in the reservoir cup 210, and supply the fuel to the engine 400. In particular, most (e.g., a majority) of the fuel discharged from the fuel pump 220 may be supplied to the engine 400 through a main filter 410, and a portion (e.g., a remaining amount) of the fuel discharged from the fuel pump 220, may be supplied to the dual jet pump 230. Accordingly, the fuel pump 220 may include a first discharge port 221 connected to the main filter 410 and a second discharge port 222 connected to the dual jet pump 230.

The portion of the fuel that is supplied to the main filter 410 may be recovered into the reservoir cup 210 through a pressure regulator 420. The pressure regulator 420 may be configured to adjust the pressure of the fuel that is recovered to the reservoir cup 210. The fuel in the reservoir cup 210 may be suctioned to the fuel pump 220 through a pre-filter 234. The dual jet pump 230 may be connected to the second purge port 316 and may be configured to suction the fuel evaporation gas in the canister 300 by the suction force generated by supply of the fuel from the fuel pump 220 during driving of the engine.

In other words, the fuel evaporation gas in the canister 300 may be transferred to the dual jet pump 230 through the second purge port 316 by the suction force generated in the dual jet pump 230 when the fuel from the fuel pump 220 is supplied to the dual jet pump 230. The dual jet pump 230 may be connected to the second purge port 316 in the canister 300 via the second purge pipe 318, and the first purge port 315 in the canister 300 may be connected to the intake pipe 431 of the engine intake system 430 and in turn to the engine 400 via the first purge pipe 317.

Figure 3:
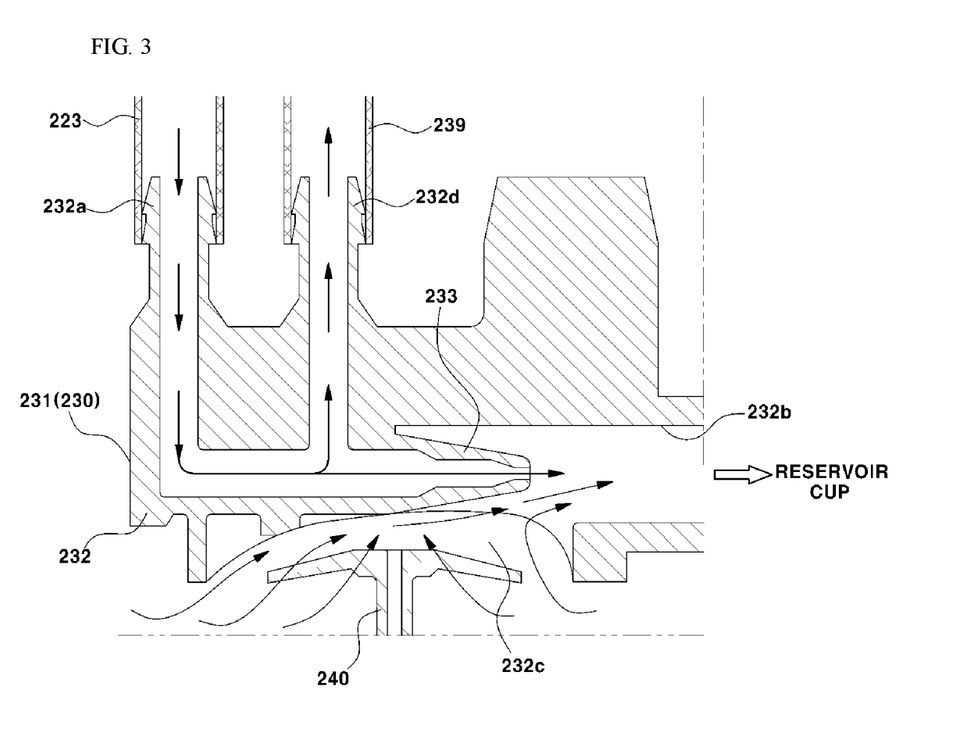
FIGS. 3 and 4 are views illustrating a dual jet pump according to the present invention.
Figure 4:
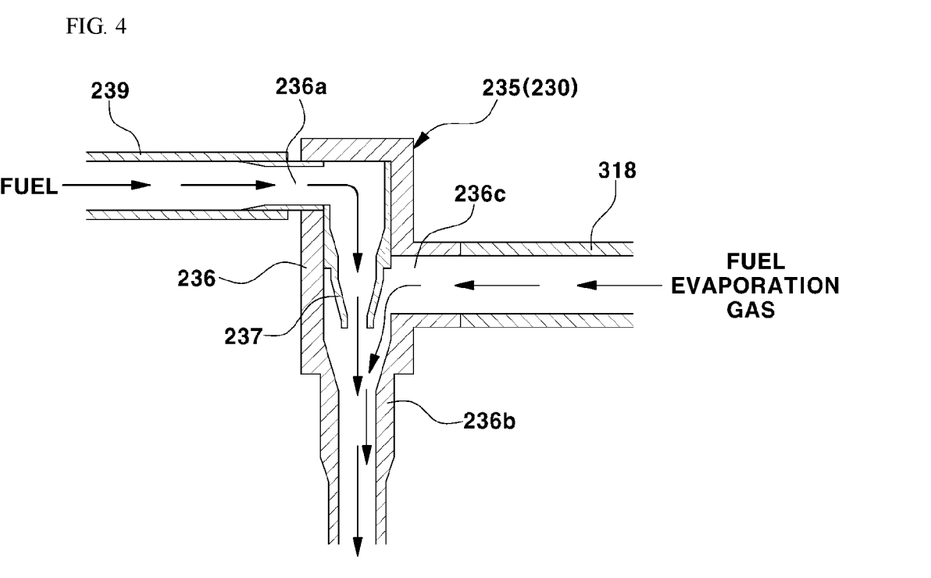

Referring to FIGS. 3 and 4, the dual jet pump 230 may include a first jet pump 231, connected to the fuel pump 220 via a discharge pipe 223, a second jet pump 235, connected to the canister 300 via the second purge pipe 318, and a communication pipe 239, which connects a first communication port 232*d* in the first jet pump 231 to a second communication port 236*a* in the second jet pump 235. The first jet pump 231 may be connected to the fuel pump 220 via the discharge pipe 223, and may be configured to suction the fuel outside the reservoir cup 210 (i.e., the fuel in the fuel tank 100), using the suction force (i.e., negative pressure) generated therein when the fuel is supplied from the fuel pump 220 and then to discharge the fuel into the reservoir cup 210.

As illustrated in FIG. 3, the first jet pump 231 may include a first jet housing 232 and a first jet nozzle 233 formed in the first jet housing 232. The first jet housing 232 may include an introduction port 232*a*, connected to the second discharge port 222 in the fuel pump 220 via the discharge pipe 223, a first suction port 232*c*, which communicates with the fuel tank 100 to allow the fuel outside the reservoir cup 210 to be introduced thereinto, a first port 232*b*, which communicates with the internal space in the reservoir cup 210 to allow the fuel discharged from the first jet nozzle 233 to be discharged to the reservoir cup 210, and the first communication port 232*d*, which is connected to the second jet pump 235 via the communication pipe 239.

The fuel outside the reservoir cup 210 may be introduced into the first suction port 232*c* through a check valve 240, which is provided in the bottom of the reservoir cup 210. The first communication port 232*d* may be formed between the introduction port 232*a* and the first jet nozzle 233 such that a portion of the fuel that is introduced into the first jet housing 232 through the introduction port 232*a* may be supplied to the second jet pump 235 through the first communication port 232*d* prior to being sprayed toward the first port 232*b* through the first jet nozzle 233.

The first suction port 232*c* may be formed between the introduction port 232*a* and the first port 232*b* to be disposed outside the first jet nozzle 233. The first jet nozzle 233 may be formed in the first jet housing 232 to be disposed between the introduction port 232*a* and the first port 232*b*, and may be configured to spray the fuel, introduced through the introduction port 232*a*, toward the first port 232*b* under high pressure.

When the fuel is sprayed from the first jet nozzle 233, the fluid in the space around the first jet nozzle 233 (i.e., the fuel in the first jet housing 232) may be discharged into the internal space in the reservoir cup 210 through the first port 232*b*. At this time, since negative pressure is generated in the first jet housing 232, the fuel outside the first jet housing 232 (i.e., the fuel in the fuel tank 100) may be suctioned into the first jet housing 232 through the first suction port 232*c*.

The fuel that is suctioned into the first jet housing 232 through the first suction port 232*c*, may be transferred to the first port 232*b* together with the fuel that is sprayed through the first jet nozzle 233, and may be discharged to the internal space in the reservoir cup 210. More specifically, the first jet nozzle 233 may be disposed upstream of the first port 232*b* to spray the fuel supplied from the fuel pump 220 toward the first port 232b. At this time, by virtue of the negative pressure generated in the space around the first jet nozzle 233, the fuel suctioned from the fuel tank 100, may be transferred into the reservoir cup 210.

Referring to FIG. 4, the second jet pump 235 may be connected to the first jet pump 231 via the communication pipe 239 such that, when the fuel from the fuel pump 220 is supplied to the first jet pump 231, the fuel may be supplied to the second jet pump 235 through the communication pipe 239. The second jet pump 235 may be configured to suction the fuel evaporation gas in the canister 300 and to discharge the fuel evaporation gas to the reservoir cup 210 by the negative pressure generated in the second jet pump 235 when the fuel is supplied to the second jet pump 235 from the first jet pump 231.

Specifically, the second jet pump 235 may include a second jet housing 236 and a second jet nozzle 237 formed in the second jet housing 236. The second jet housing 236 may include the second communication port 236a, which is connected to the first communication port 232d via the communication port 239, a second suction port 236c, which is connected to the second purge port 316 in the canister 300 via the second purge pipe 318, and a second port 236b, which communicates with the internal space in the reservoir cup 210 to discharge the fuel discharged from the second jet nozzle 237 to the reservoir cup 210.

The second jet nozzle 237 may be formed in the second jet housing 236 to be positioned between the second communication port 236a and the second port 236b. Consequently, the fuel supplied from the first jet housing 232 through the second communication port 236a may be sprayed toward the second port 236b under high pressure. Since negative pressure is generated in the space around the second jet nozzle 237 (i.e., the internal space in the second jet housing 236) when the fuel is sprayed from the second jet nozzle 237, the fuel evaporation gas in the canister 300 may be suctioned into the second jet housing 236 through the second suction port 236c.

In particular, the second suction port 236c may be formed between the second communication port 236a and the second port 236b to be positioned outside the second jet nozzle 237. The fuel evaporation gas suctioned into the second jet housing 236 through the second suction port 236c may be transferred to the second port 236b and discharged to the internal space in the reservoir cup 210 together with the fuel sprayed from the second jet nozzle 237. More specifically, the second jet nozzle 237 may be disposed upstream of the second port 236b to spray the fuel introduced through the first jet pump 231 toward the second port 236b. At this time, the fuel evaporation gas suctioned from the canister 300 by virtue of the negative pressure generated in the space around the second jet nozzle 237 may be transferred to the reservoir cup 210.

The apparatus for purging fuel evaporation gas in a fuel system, which is constructed as described above, may purge the fuel evaporation gas in the canister 300 to the engine intake system 430 through the first purge port 315 and also purge the fuel evaporation gas in the canister 300 to the reservoir cup 210 in the fuel tank 100 through the second purge port 316. Accordingly, it may be possible to increase the amount of the fuel evaporation gas, that is removed (i.e., the amount that is desorbed) during driving of the engine, and to prevent deterioration of the canister 300. Particularly, since the second purge port 316 is formed to directly communicate with the portion of the space in the canister 300 in which most of the fuel evaporation gas remains, it may be possible to advantageously prevent deterioration of the canister 300.

As is apparent from the above description, the apparatus for purging fuel evaporation gas in a fuel system according to the present invention is capable of increasing the amount of fuel evaporation gas that desorbed from a canister during driving of an engine and thus of preventing the fuel evaporation gas adsorbed to the canister from being discharged to the atmosphere. Furthermore, it may be possible to prevent a phenomenon, in which the working capacity of the canister decreases due to fuel evaporation gas remaining in the canister (i.e., deterioration of the canister) by reducing the amount of fuel evaporation gas remaining in the canister.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for purging fuel evaporation gas in a fuel system, comprising:
 a canister connected to a fuel tank through an inlet port provided in the canister to collect and store fuel evaporation gas transferred from the fuel tank;
 a first purge port provided in the canister and connected to an engine intake system, the first purge port allowing fuel evaporation gas collected in the canister to be transferred to the engine intake system by virtue of negative pressure, which is generated in the engine intake system during driving of an engine; and
 a second purge port provided in the canister and connected to a dual jet pump of a fuel pump module disposed in the fuel tank, the second purge port allowing the fuel evaporation gas collected in the canister to be transferred to the dual jet pump by negative pressure generated in the dual jet pump during driving of the engine,
 wherein the canister includes:
  a case filled with an adsorptive material capable of adsorbing fuel evaporation gas;
  a partition wall formed in the case to partition an internal space in the case into a first space and a second space; and
  an atmosphere port formed in a portion of the case to directly communicate with the second space and to allow air to be introduced thereinto,
 wherein the first purge port is formed in a portion of the case to directly communicate with the first space, and the second purge port is formed in a portion of the case to face the atmosphere port in a direction in which air flows in the second space;
 wherein the inlet port is formed in the case, and connected to the fuel tank to allow fuel evaporation gas to be introduced thereinto from the fuel tank,
 wherein the first purge port, the inlet port, and the atmosphere port are formed in a first wall part of the case, and
 wherein the second purge port is formed in a second wall part, which is positioned opposite the first wall part.

2. The apparatus of claim 1, wherein the fuel pump module includes:
 a reservoir cup disposed in the fuel tank to receive fuel in the fuel tank by the dual jet pump;

a fuel pump configured to transfer fuel in the reservoir cup to the engine under pressure and to transfer the fuel to the dual jet pump during driving of the engine; and the dual jet pump configured to generate negative pressure required to suction the fuel in the fuel tank and the fuel evaporation gas in the canister using pressure generated by discharging the fuel supplied from the fuel pump.

3. The apparatus of claim 2, wherein the duel jet pump includes:

a first jet pump, connected to the fuel pump and configured to suction the fuel in the fuel tank and to discharge the fuel into the reservoir cup by negative pressure generated in the first jet pump when the fuel is supplied from the fuel pump; and a second jet pump, connected both to the canister and to the first jet pump and configured to suction the fuel evaporation gas in the canister and to discharge the fuel evaporation gas into the reservoir cup by negative pressure generated in the second jet pump when fuel is supplied from the first jet pump.

4. The apparatus of claim 3, wherein the first jet pump includes:

a first jet housing including an introduction port connected to the fuel pump to receive fuel from the fuel pump, a first suction port in communication with the fuel tank to allow fuel outside the reservoir cup to be introduced thereinto, and a first port in communication with an internal space in the reservoir cup; and a first jet nozzle formed in the first jet housing to spray the fuel supplied from the fuel pump to the first port.

5. The apparatus of claim 4, wherein the second jet pump includes:

a second jet housing having a second communication port connected to the first jet housing to receive fuel from the first jet housing, a second suction port connected to the second purge port in the canister, and a second port in communication with the internal space in the reservoir cup; and a second jet nozzle formed in the second jet housing to spray fuel supplied from the first jet housing to the second port.

6. The apparatus of claim 5, wherein the second jet nozzle is formed in the second jet housing to be positioned between the second communication port and the second port.

7. The apparatus of claim 5, wherein the first jet housing includes a first communication port formed between the introduction port and the first jet nozzle, the first communication port being connected to the second communication port via a communication pipe.

8. The apparatus of claim 5, wherein the second suction port is formed between the second communication port and the second port to be positioned outside the second jet nozzle.

9. The apparatus of claim 5, wherein the second jet housing is configured to suck the fuel evaporation gas in the canister by virtue of negative pressure generated in the second jet housing when the fuel is sprayed from the second jet nozzle, and the fuel evaporation gas sucked into the second jet housing is discharged to the internal space in the reservoir cup together with the fuel sprayed from the second jet nozzle.

10. The apparatus of claim 4, wherein the first jet nozzle is formed in the first jet housing to be positioned between the introduction port and the first port.

11. The apparatus of claim 4, wherein the first suction port is formed between the introduction port and the first port to be positioned outside the first jet nozzle.

12. The apparatus of claim 4, wherein the first jet housing is configured to suction the fuel in the fuel tank by virtue of negative pressure generated in the first jet housing when the fuel is sprayed from the first jet nozzle, and the fuel suctioned into the first jet housing is discharged to the internal space in the reservoir cup together with the fuel sprayed from the first jet nozzle.

* * * * *